Oct. 10, 1961          A. G. GAGE          3,003,797
PACKING ASSEMBLY
Filed Nov. 17, 1958
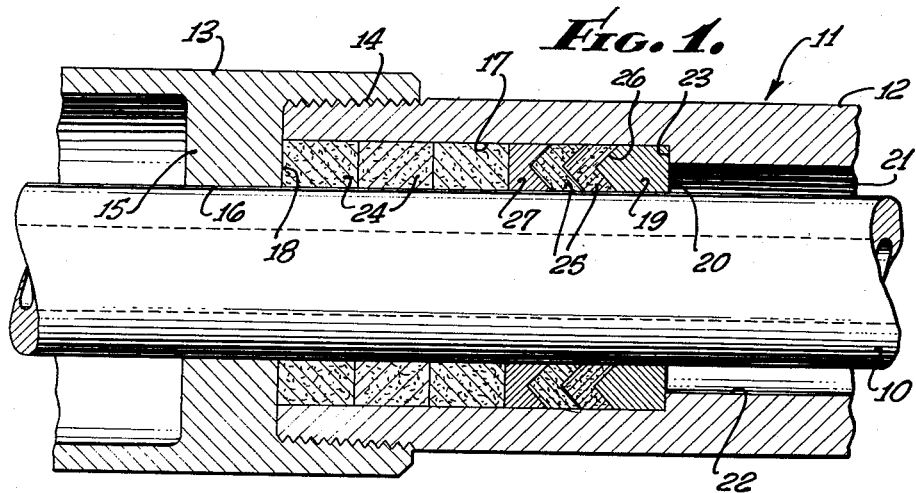
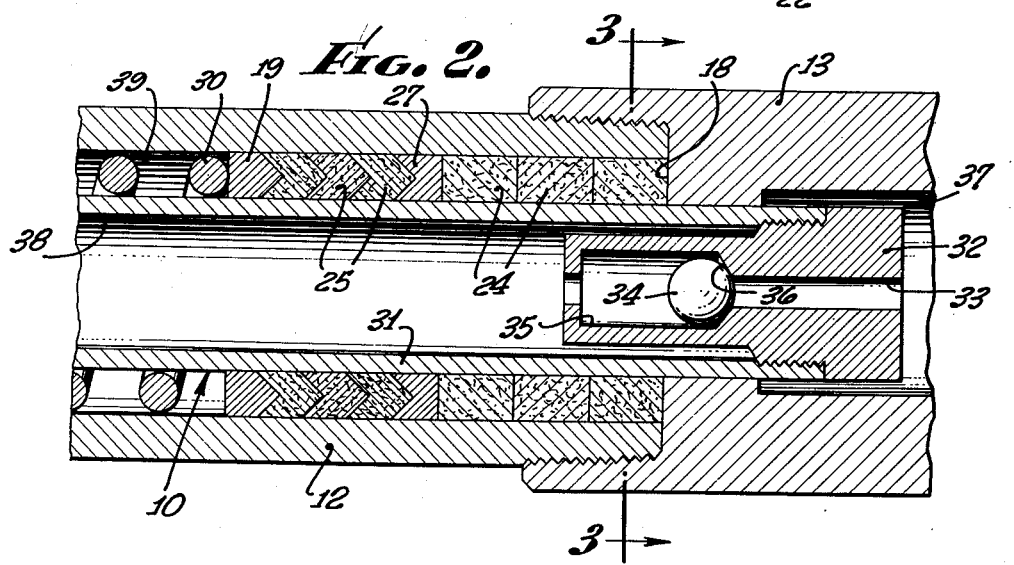
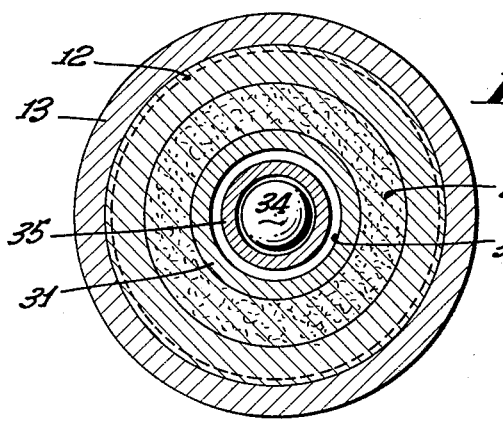
INVENTOR.
ARTHUR G. GAGE
BY
ATTORNEYS.

United States Patent Office 3,003,797
Patented Oct. 10, 1961

3,003,797
PACKING ASSEMBLY
Arthur Glover Gage, 7000 E. Gage Ave., Bell, Calif.
Filed Nov. 17, 1958, Ser. No. 774,301
2 Claims. (Cl. 286—30)

This invention relates generally to improvements in packing assemblies, and more particularly concerns packing off around pump plungers that are axially reciprocable for pumping fluid coming in pressurized contact with the packing assembly.

It is a major object of the invention to provide an improved packing assembly characterized as having extremely long life and use, as being simple of construction, and facilitating ready replacement of the packing material in the assembly, the invention eliminating the need for honed barrels, and ensuring highly efficient sealing performance over extended periods of time.

More particularly, the invention is directed to the combination with a plunger of tubular means having a reduced bore closely receiving the plunger for endwise reciprocation therethrough, the tubular means also having an enlarged bore outwardly spaced from the plunger and a shoulder at one end of the space between the reduced and enlarged bores, compressible packing material in said space in engagement with the shoulder, and a pressure ring received within the enlarged bore and mounted on the plunger in closely interfitting relation therewith to move bodily endwise along the enlarged bore toward the shoulder for pressurizing the packing therebetween and into sealing relation with the plunger in response to fluid pressure exertion against the ring. The clearance between the plunger and the reduced bore is made greater than each of the clearances between the plunger and ring and between the ring and the enlarged bore to an extent such that the packing may be pressurized for sealing off against the plunger and the enlarged bore in response to fluid pressure exertion against the movable pressure ring. On the other hand, the relatively larger clearance between the plunger and reduced bore is not so large as will permit the packing to extrude therebetween with resultant loss of packing during reciprocation of the plunger and pressurization of the packing. Also, the clearance between the plunger and the reduced bore is such as will induce slight leakage of pressurized fluid between the packing and the plunger for lubricating the latter during reciprocation thereof. Finally, the clearance between the plunger and the reduced bore is not so large as to cause excessive pressurization of the packing and consequent binding of the plunger.

Another object of the invention includes the provision of screwed together pin and box members, the box member having the reduced bore closely receiving the plunger and the pin member having the enlarged bore receiving the plunger and the packing which engages a shoulder formed on the box member between the reduced and enlarged bores. The pin and box members are then separable by relative unscrewing thereof permitting direct and easy replacement of the packing material. Finally, the invention is concerned with the provision of a packing, a first portion of which, engaging a shoulder adjacent the relatively larger clearance between the plunger and the reduced bore, has a rectangular cross-section to minimize extrusion of the packing into that clearance, and a second portion of which packing engages the pressure ring along an endwise tapering interface that is substantially V-shaped in axial radial planes. The latter packing portion effects the greater part of the sealing action between the plunger and the counterbore or enlarged bore, and has flexible lips which are readily spread and forced against the counterbore and plunger for more effective sealing. Between these packing portions is a load or spacer ring operative to transfer pressurization from the V-shaped packing to the rectangular cross-section and also to prevent leakage of lubricant impregnating the packing portions.

These and other objects of the present invention, as well as the details of an illustrative embodiment, will be more fully understood from the following detailed description of the drawings, in which:

FIG. 1 is a cross-section through the plunger and packing assembly taken in an axial radial plane;

FIG. 2 is a cross-section taken through a somewhat modified packing assembly and plunger combination in an axial radial plane; and FIG. 3 is a cross-section taken on line 3—3 of FIG. 2.

Referring first to FIG. 1, the plunger indicated at 10, and which will be understood is axially reciprocable, is surrounded by tubular means generally indicated at 11 and including a pin member in the form of a cylinder or barrel 12, and a box member 13 or housing into which the pin member is screwed at threads 14. The box member is provided with an internal flange 15 having a reduced bore 16 closely receiving the plunger 10 for endwise reciprocation therethrough. Likewise, the pin member has an enlarged bore or counterbore 17 spaced outwardly from the plunger, the space therebetween terminating at shoulder 18 formed on the flange 15 in a radial plane normal to the axis of the plunger. The terminal end of the pin member 12 bottoms at shoulder 18 to limit the screwing together of the pin and box members at the correct spacing as regards desired sealing operation of the packing to be disclosed.

Received in the enlarged bore 17 and mounted on the plunger in closely interfitting relation therewith, is a pressure ring 19 typically made of bronze and which is movable bodily endwise along or within the enlarged bore toward shoulder 18 in response to fluid pressure exertion against the end 20 of the ring. For purposes of description, it will be understood that high pressure fluid is received in the chamber or space 21 to the right of the ring 19 between the plunger and bore 22 of the pin member. A shoulder 23 between bore 22 and counterbore 17 acts to limit rightward movement of the pressure ring from any cause whatsoever, such as during rightward movement of the plunger 10.

Coming now to a description of the compressible packing in the space between the pressure ring 19 and the shoulder 18, it will be seen to include a first packing portion engaging the shoulder 18 and having a rectangular cross-section, and including a plurality of packing annuli 24. The second portion of the packing includes V-shaped or CHEVRON type packing annuli 25, the rightward one of which engages the pressure ring 19 along an endwise tapering end face 26. The latter is formed by the leftward tapering surface extent of the pressure ring and by the leftwardly and inwardly tapering surface extent of the first CHEVRON packing 25 to the left of the ring 19.

Interposed between the rectangular and CHEVRON cross-section packing annuli is a load or spacer ring 27, the rightward face of which is tapered inwardly and leftwardly to receive the CHEVRON packing annulus adjacent thereto and the leftward face of which extends in a plane perpendicular to the axis of the plunger to seat the rectangular cross-section of the packing annulus 24 adjacent thereto. Load ring 27 is freely bodily movable along or longitudinally to transfer pressurization from the packing annuli 25 to the packing annuli 24. Furthermore, it prevents leakage of lubricant impregnate between the packing annuli 24 and 25.

Referring to the operation of the two different types of packing annuli 24 and 25, the latter by virtue of their flexible lips serve to give maximum sealing efficiency through their capacity to be readily forced against the plunger and the enlarged counterbore 17 by the pressure ring 19. Furthermore, these packing annuli are located at the region wherein most of the sealing effect occurs as a result of greater proximity to the high pressure fluid in chamber 21. Packing annuli 24, on the other hand, are rectangular in shape in order to minimize the tendency to extrude into and through the relatively larger clearance between the reduced bore 16 and the plunger. Thus, the combination shown provides for maximum sealing effect as well as minimum tendency for packing extrusion from the packing zone.

As mentioned in the introduction, the clearance between the plunger 10 and the reduced bore 16 is larger than each of the clearances between the pressure ring 19 and the plunger, and between the pressure ring and counterbore 17, all for the purposes previously described. Even larger clearances preferably exist between the load ring 27 and the plunger and between that ring and the counterbore 17 in order that the loading or pressurization of all of the packing annuli against the plunger will not be affected by the ring 27. Merely as illustrative, the clearance between the plunger and reduced bore 16 may be .008 inch, and each of the clearances between pressure ring 19 and the plunger and the pressure ring and the counterbore 17 may be say .002 inch, while each of the clearances between load ring 27 and the plunger and ring 27 and the counterbore 17 may be say .030 inch.

The modified form of the invention shown in FIGS. 2 and 3 is the same as that shown in FIG. 1 with the exception that a compression spring 30 bears against the pressure ring 19 urging it toward the shoulder 18 at all times. The structure of the plunger is somewhat changed in that it includes a tube 31 having an insert 32 screwed into one end thereof for closing the same, the insert containing a port 33 adapted to be opened and closed by movement of a ball check valve 34 within a chamber portion 35 of the insert, in response to axial reciprocation of the plunger. Thus, on rightward movement of the latter the ball 34 unseats from the shoulder 36 allowing fluid to pass leftwardly from chamber 37 through the port 33 and the bore 38 of the tubular plunger 31 into the chamber 39 between the plunger and counterbore 17. Conversely, upon leftward movement of the plunger 10, the ball check valve 34 seats at 36 and the fluid in chamber 39 is pressurized and allowed to escape through a port not shown. Thus, it will be clear that upon rightward movement of the plunger fluid pressure exists in chamber 37 adjacent the flange 15, and will tend to leak through the clearance between the plunger and the reduced bore 16 to exert pressure against the packing annulus 24 adjacent shoulder 18.

The spring 30 is selected to exert sufficient and continuous counter force against the pressure ring 19 to hold the packing annuli and rings 19 and 27 against bodily displacement away from shoulder 18, as might otherwise be caused by the fluid pressure in chamber 37, in the absence of the spring 30.

I claim:

1. In combination with a pump plunger, tubular means including screwed together pin and box members, said box member having an internal flange forming a reduced bore closely receiving the plunger for axial reciprocation therethrough and said pin member having an enlarged bore receiving the plunger in outwardly spaced relation thereto, said box member having a flange shoulder at one end of said space and extending between said reduced and enlarged bores, compressible non-metallic packing material in said space in engagement with said shoulder, and a metallic pressure ring received in said enlarged bore and mounted on the plunger in closely interfitting relation therewith to move bodily endwise along said enlarged bore toward said shoulder for pressurizing said packing therebetween and into sealing relation with the plunger and enlarged bore in response to fluid pressure exertion against the ring, the control clearance between the plunger and said reduced bore being at least twice as great as each of the clearances between said plunger and ring and between said ring and said enlarged bore to induce slight fluid leakage between the packing and plunger for lubricating the plunger during reciprocation thereof, said packing extending directly adjacent the control clearance in blocking relation therewith and said control clearance being sufficiently small to prevent excessive pressurization of the packing causing binding of the plunger, the terminal end of said pin member and said box member flange shoulder being in tight interengagement about the terminal end of said packing and said pin and box members being separable by relative unscrewing thereof to expose said packing material permitting direct replacement thereof, a first portion of said packing engaging said shoulder having a rectangular cross-section in axial radial planes and a second portion of said packing engaging said pressure ring along an endwise tapering interface that is substantially V-shaped in axial radial planes, and a metallic spacer ring received in said enlarged bore and movable along the plunger between said first and second packing portions, said ring engaging said second packing portion along an endwise tapering interface that is substantially V-shaped in axial radial planes, the clearance between the spacer ring and the plunger being greater than the control clearance between the plunger and reduced bore and greater than the clearances between the pressure ring and plunger and between the pressure ring and enlarged bore.

2. The invention as defined in claim 1 in which said clearance between the spacer ring and plunger is several times greater than said control clearance, and said control clearance is several times greater than the clearance between said pressure ring and plunger.

References Cited in the file of this patent

UNITED STATES PATENTS

| | | |
|---|---|---|
| 1,676,391 | Humason et al. | July 10, 1928 |
| 2,019,523 | Davies | Nov. 5, 1935 |
| 2,118,855 | Miller | May 31, 1938 |
| 2,151,850 | Hedrick et al. | Mar. 28, 1939 |
| 2,235,289 | Dunn et al. | Mar. 18, 1941 |
| 2,264,147 | Dunlevy | Nov. 25, 1941 |
| 2,281,933 | Gage | May 5, 1942 |
| 2,430,836 | Taylor | Nov. 11, 1947 |
| 2,525,747 | Hess | Oct. 10, 1950 |
| 2,807,484 | Stewart | Sept. 24, 1957 |